United States Patent [19]

Alderfer et al.

[11] Patent Number: 5,095,939
[45] Date of Patent: Mar. 17, 1992

[54] REDUNDANT PRESSURIZING VALVE

[75] Inventors: Ronald R. Alderfer, South Bend; Paul W. Futa, Jr., North Liberty, both of Ind.

[73] Assignee: Allied-Signal Inc., Morristown, N.J.

[21] Appl. No.: 718,304

[22] Filed: Jun. 13, 1991

[51] Int. Cl.$^5$ .............................................. F16K 17/04
[52] U.S. Cl. ................................ 137/512.1; 137/512.2; 137/512.5
[58] Field of Search ................. 137/512.1, 512.2, 512.5

[56] References Cited

U.S. PATENT DOCUMENTS 3,749,121  7/1973  Frankewich ..................... 137/512.2
3,856,041  12/1974  Cryder ........................... 137/512.2 X Primary Examiner—Robert G. Nilson
Attorney, Agent, or Firm—Leo H. McCormick, Jr.; Larry J. Palguta; Robert A. Walsh

[57] ABSTRACT

A pressuring valve having a housing with a bore therein for retaining concentric first and second pistons within a sleeve having an end wall with an entrance port connected to a first conduit. A spring within the bore urges a first face on the first piston toward a first seat which surrounds the entrance port and a second face on the second piston toward a second seat surrounding an annular opening in the first piston. The fluid pressure in the first conduit acts on the first face to overcome the spring and move the first piston away from the entrance port to allow fluid to flow to an exit port in the housing. This type flow continues until such time that the first piston fails to move when the fluid pressure thereafter acts on the second face to move the second piston and allow the fluid to flow to the exit by way of the annular opening and a plurality of axial opening in the first piston to maintain the fluid pressure in the first conduit substantially constant.

4 Claims, 1 Drawing Sheet

REDUNDANT PRESSURIZING VALVE

This invention relates to a fluid pressurizing valve having redundant first and second pistons that are sequentially moved by a fluid pressure in a conduit to maintain the fluid pressure in the conduit within predetermined limits.

In some controls it is desirable to maintain a fluid pressure substantially constant over an operating range. The constant pressure allows the operation of various components to be determined and as a result functional inputs may be treated as substantially a constant. Should the fluid pressure deviate from above a maximum limit, the operation of a control will not meet a desired standard and could cause a failure in the system. To assure that the fluid pressure below a maximum limit, it has been demonstrated that parallel valves could be connected to a conduit to maintain maximum the fluid pressure therein should one valve fail or become inoperative. Unfortunately, the use of parallel valves increases weight, cost and space required for packaging within a system.

In the present invention, a pressurizing valve having a single housing retains concentric first and second pistons to control the flow of fluid from a conduit and maintain the fluid pressure therein with a predetermined range. The housing has a bore with an exit port and a sleeve located therein. A first diameter of the sleeve engages said bore to prevent fluid communication from the bore to the exit port while a smaller second diameter allows substantially unrestricted fluid communication from a plurality of openings in the sleeve along said bore to the interior of said sleeve. An end wall in the sleeve has a first annular seat that surrounds an entrance port connected to the conduit. The first piston, which is located in the sleeve, has a first face with a first effective area corresponding to the diameter of the entrance port in the end wall. The first piston has a first annular opening connected to the entrance port in the end wall and a plurality of axial openings which surround a second annular seat of the first annular opening. The second piston, which is located in the first piston, has a second face with a second effective area corresponding to the diameter of the first annular opening in the first piston. A resilient member located in the bore urges the second piston toward the first piston to bring the second face into engagement with the second annular seat while at the same time urging the first piston toward the end wall to bring the first face into engagement with the first seat. The fluid pressure in the first conduit acts on the first face to overcome the resilient member and moves the first piston and correspondingly the first face away from the first seat to allow fluid to flow to the exit port by way of the entrance port in the end wall and the plurality of radial opening in the sleeve. The fluid pressure of the fluid presented to the exit port is communicated to the interior of the sleeve and acts on the second piston to maintain the engagement of the second face with the second annular seat. The operation of the pressurizing valve continues to depend on the movement of the first piston until such time as the first piston become inoperative by failing to move open within the bore. Should the first piston become inoperative, the fluid pressure in the first conduit thereafter acts on the second face to overcome the resilient member and moves the second piston and correspondingly the second face away from the second seat. With the second face off the second seat, fluid flows to the exit port by way of the entrance port in the end wall, first annular opening and plurality of axial openings in the first piston and radial openings in the sleeve to continue to maintain the fluid pressure in the conduit within the desired fluid pressure range.

It is an object of this invention to provide a system with pressurizing valve having first and second concentric pistons located in a housing and sequentially activated by a fluid pressure to maintain the fluid pressure in a conduit within a predetermine pressure range.

It is a further object of this invention to provide a pressuring valve with a single spring or resilient member which concurrently acts on first and second concentric pistons to control the flow of fluid from a conduit to maintain the fluid pressure therein within a predetermined range.

It is still a further object of this invention to provide a pressurizing valve with redundant and concentric pistons to maintain the fluid pressure in a conduit within a predetermined range using a minimum of parts and space required to packaging.

These objects and advantages should be apparent from reading this specification while viewing the drawings wherein.

Figure 1:
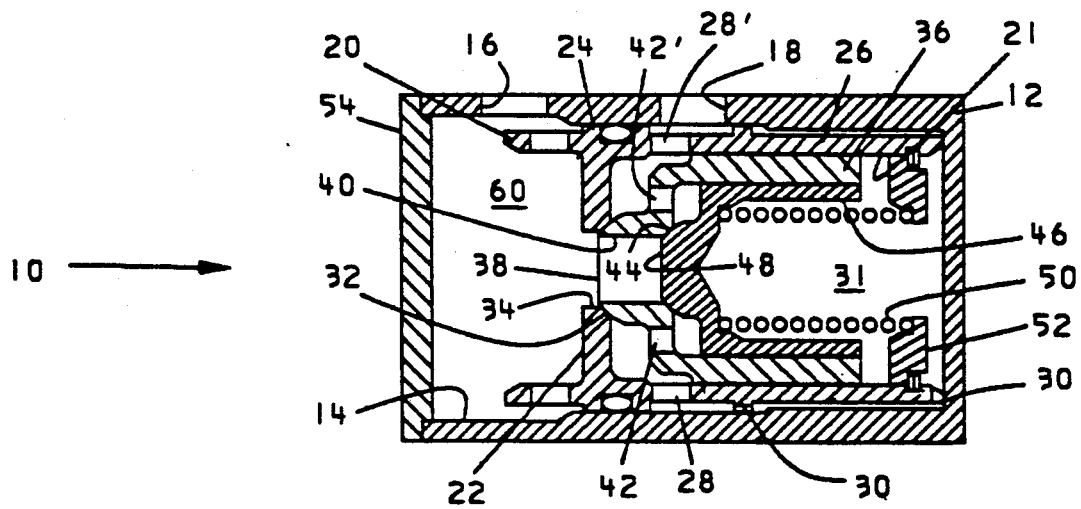
FIG. 1 is a section view of a schematic illustration of a pressurizing valve made according to the principals of this invention for use in a system wherein the fluid pressure of fluid in a first conduit is below a minimum fluid sufficient to activate one of the concentric first and second pistons to allow fluid to flow to a second conduit.

A pressuring valve 10 as shown in FIG. 1 has a housing 12 with a bore 14 therein. The bore 14 is connected to a first conduit by control port 16 and to a second conduit by an exit port 1. A sleeve 20 located in bore 14 has a first diameter 24 that engages bore 14 to prevent fluid communication from the supply port 16 to the exit port 18 and a second diameter 26 which has sufficient peripheral clearance and slots 30, 30' to allow substantially unrestricted fluid communication from a plurality of openings 28, 28' along bore 14 to a chamber 31 formed in the interior of sleeve 20. An end wall 22 in the sleeve 20 has an annular seat 32 which surrounds an entrance port 34 that is connected to the supply port 16. The plurality of radial openings 28, 28' adjacent the end wall 22 connect entrance port 34 with the exit port 18.

A first piston 36 located in sleeve 20 has a first face 38 with a first effective area corresponding to the diameter of seat 32 for entrance port 34 in end wall 22. The first piston 36 has a first annular opening 40 and a plurality of axial openings 42, 42' which are concentric to the first annular opening 40. The first annular opening 40 has a second annular seat 44 which is slightly smaller in diameter resulting in a smaller effective area than the first annular seat 32.

A second piston 46 concentric to and located in the first piston 36 has a second face 48 with a second effective area corresponding to the diameter of the first annular opening 40 in the first piston 36.

A single spring or resilient member 50 caged in sleeve 20 by a snap ring or other stop member 52 urges the second piston 46 toward the first piston 36 to bring the second face 48 into engagement with the second annular seat 44 while at the same time the first piston 36 is urged toward the end wall 22 to bring the first face 38 into engagement with the first seat 32. After the sleeve 20 containing the concentric pistons 36 and 46 is placed in bore 14, an end cap 54 is attached to housing 12 to form a sealed chamber 60 in housing 12.

Figure 2:
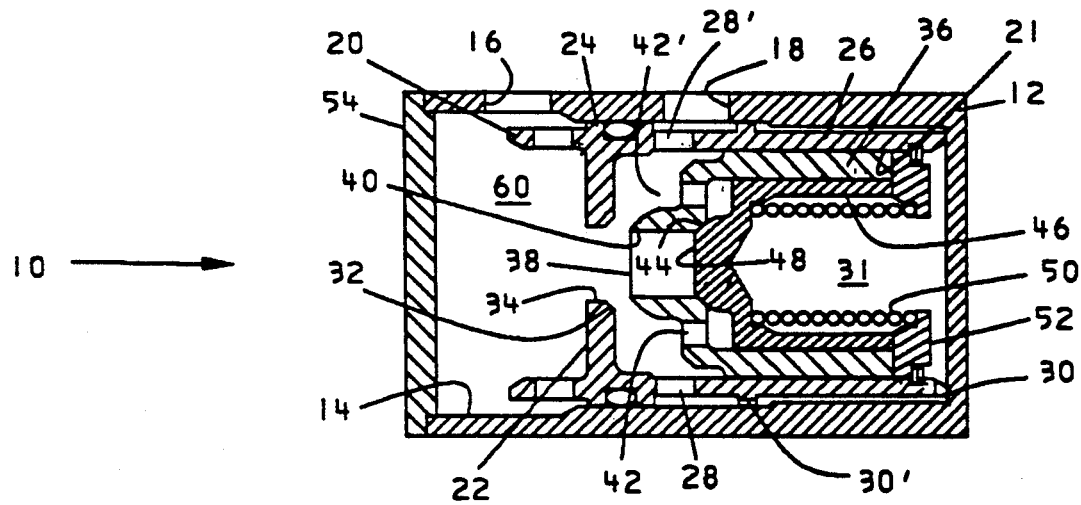
FIG. 2 is a sectional view of the pressurizing valve of FIG. 1 wherein flow between a first conduit and a second conduit is controlled by a first piston.
Figure 3:
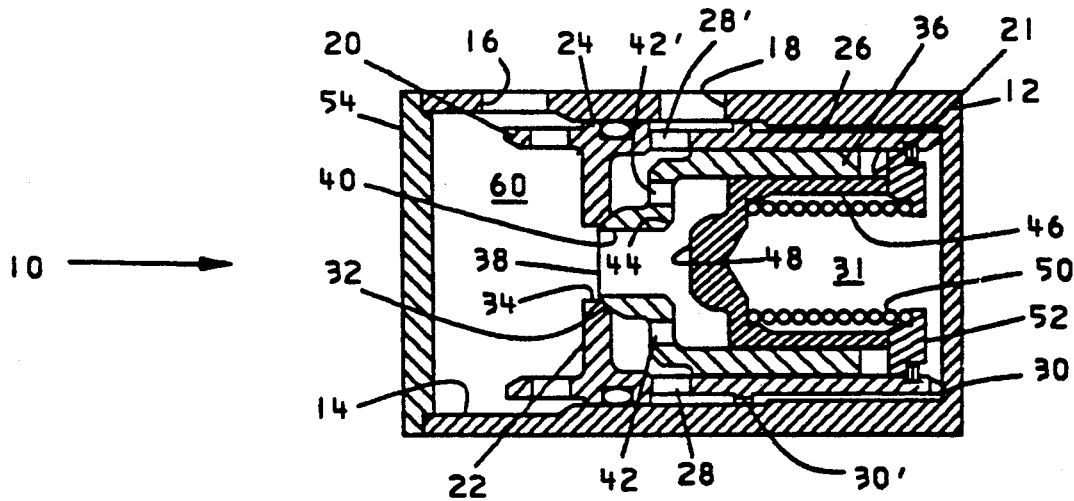
FIG. 3 is a sectional view of the pressurizing valve of FIG. 1 wherein flow between a first conduit and a second conduit is controlled by a second piston.

The pressuring valve 10 as shown in FIG. 1 is in the inoperative state wherein the fluid pressure of the fluid in the first conduit is incapable of overcoming the force of the spring or resilient member 50. In this condition, even though the fluid in the supply port 16 enters chamber 60, the fluid pressure is insufficient to overcome spring 50 and as a result the first and second concentric pistons 36 and 46 remain seated. When the fluid pressure in the first conduit reaches a preset fluid pressure level, this fluid pressure acts on the first face 38 to create a force which overcomes the force of the single spring or resilient member 50 and moves the concentric first and second pistons 36 and 46 within sleeve 20, as shown in FIG. 2. In this operational state, fluid flows to the exit port 18 by way of the entrance port 34 in end wall 20 and the plurality of radial opening 28, 28' in sleeve 20. The fluid pressure of the fluid that is communicated to the exit port 18 also being communicated to the interior of sleeve 20 by way of the flow path created between the second diameter 26 of the sleeve 20 and bore 1,4 and slots 30, 30' to supply reference pressure to the first piston 36 and second piston 46 to maintain the engagement of the second face 48 with the second annular seat 44. This is the normal operation of the pressurizing valve 10 to maintain the fluid pressure of the fluid supplied to exit port 18 within a predetermined range. However should the movement of the first piston 36 become restricted through contamination build up on sliding surface 21 or actually fail to move within bore 14, the redundancy provided by the second piston 46 comes into action in the following manner as best shown in FIG. 3.

In order to activate the second piston 46, the fluid pressure in chamber 60 is communicated to the second face 48 by way of entrance port 34 and annular opening 40 on the first piston 36. The fluid pressure thereafter acts on the second face 48 to develop a force which overcomes the single spring or resilient member 50 and moves the second piston within the first piston 36. When the second piston 46 moves, the second face 48 also moves away from the second seat 44 to allow fluid to flow to the exit port 18 by way of the entrance port 34 in the end wall 22, first annular opening 40 and the plurality of axial openings 42, 42' in the first piston 36 and radial openings 28, 28' in the sleeve 20.

Under some circumstances, it may be desirable to provide the pressurizing valve with a sensor to inform an operator of a failure of the first piston 36 to move in response to a fluid pressure. This sensor could be a simple pin that extends through housing 12, an optical member or an electrical activated switch that is activated by the failure of movement of the first piston 36.

Through the use of a single spring or resilient member 50 and by selecting the effective area of the first face 38 and the second face 48, the fluid pressure of the fluid in the first conduit can be maintained within a predetermined pressure range which is substantially constant.

Thus the pressurizing valve 10, as disclosed herein provides a system with redundant means for maintaining the fluid pressure within the system within a predetermined range which will not damage the component parts therein.

We claim:

1. A pressuring valve for assuring that the pressure of a fluid in a first conduit is maintained within a predetermined pressure range, said pressuring valve comprising:
    a housing having a bore therein connected to said first conduit, said housing having an exit port for connecting said bore to a second conduit;
    a sleeve located in said bore having an end wall, said end wall having a first annular seat that surrounds an entrance port connected to said first conduit, said sleeve having plurality of radial openings adjacent said end wall connected to said exit port, said sleeve having a first diameter that engages said bore to prevent fluid communication to said exit port and a second diameter which has sufficient peripheral clearance to allow substantially unrestricted fluid communication from said plurality of openings along said bore to the interior of said sleeve;
    first piston means located in said sleeve having a first face with a first effective area corresponding to the diameter of said entrance port in said end wall, said first piston means having a first annular opening and a plurality of axial openings which surround a second annular seat of said first annular opening;
    second piston means concentric to and located in said first piston means, said second piston means having a second face with a second effective area corresponding to the diameter of said first annular opening in said first piston means; and
    resilient means located in said bore for urging said second piston means toward said first piston means to bring said second face into engagement with said second annular seat and for urging said first piston toward said end wall to bring said first face into engagement with said first seat, said fluid pressure in said first conduit acting on said first face to overcome said resilient means and move said piston means and correspondingly the first face away from said first seat to allow fluid to flow to said exit port by way of said entrance port in said end wall and plurality of radial opening in said sleeve, said fluid pressure further being communicated to the interior of said sleeve to act on said second piston means and maintain the engagement of said second face with said second annular seat until such time as said first piston means become inoperative by failing to move within said bore thereafter said fluid pressure therein acts on said second face to overcome said resilient means and moves said second piston and correspondingly the second face away from said second seat to allow fluid to flow to said exit port by way of said entrance port in said end wall, first annular opening and plurality of axial openings in said first piston means and radial openings in said sleeve.

2. The pressuring valve as recited in claim 1 further including:
    stop means connected to said sleeve for caging said resilient means within said second piston means.

3. The pressuring valve as recited in claim 2 wherein said first face and said second face have a differential area to maintain said fluid pressure in said first conduit within a predetermined pressure range which is substantially constant.

4. The pressuring valve as recited in claim 3 wherein said resilient means is a single spring that acts on both the first and second piston means to establish the substantially constant fluid pressure in said first conduit.

* * * * *